US009380091B2

(12) United States Patent
Bao et al.

(10) Patent No.: US 9,380,091 B2
(45) Date of Patent: Jun. 28, 2016

(54) SYSTEMS AND METHODS FOR USING CLIENT-SIDE VIDEO BUFFER OCCUPANCY FOR ENHANCED QUALITY OF EXPERIENCE IN A COMMUNICATION NETWORK

(71) Applicant: Cygnus Broadband, Inc., San Diego, CA (US)

(72) Inventors: Yiliang Bao, San Diego, CA (US); David Gell, San Diego, CA (US); Kenneth L. Stanwood, Vista, CA (US); Ahmed ElArabawy, San Diego, CA (US)

(73) Assignee: Wi-LAN Labs, Inc., San Diego, CA (US)

( * ) Notice: Subject to any disclaimer, the term of this patent is extended or adjusted under 35 U.S.C. 154(b) by 520 days.

(21) Appl. No.: 13/789,462

(22) Filed: Mar. 7, 2013

(65) Prior Publication Data

US 2014/0082146 A1 Mar. 20, 2014

Related U.S. Application Data

(60) Provisional application No. 61/658,854, filed on Jun. 12, 2012.

(51) Int. Cl.
*G06F 15/16* (2006.01)
*H04L 29/06* (2006.01)

(52) U.S. Cl.
CPC .............. *H04L 65/60* (2013.01); *H04L 65/605* (2013.01); *H04L 65/80* (2013.01)

(58) Field of Classification Search
CPC ....... H04L 29/06; H04L 65/60; H04L 65/605; H04L 65/80
See application file for complete search history.

(56) References Cited

U.S. PATENT DOCUMENTS 8,554,879 B2 * 10/2013 Yu et al. ........................ 709/219
8,902,782 B2 12/2014 Gustafsson et al.
9,032,427 B2 5/2015 Gallant et al.
9,037,743 B2 5/2015 Kordasiewicz et al.
2004/0057446 A1 * 3/2004 Varsa et al. .................. 370/412
2007/0133405 A1 6/2007 Bowra et al.

(Continued)

OTHER PUBLICATIONS

International Search Report and Written Opinion for related international application No. PCT/US13/044253, mailed Sep. 11, 2013, in 8 pages.

(Continued)

*Primary Examiner* — Benjamin M Thieu
(74) *Attorney, Agent, or Firm* — Procopio, Cory, Hargreaves & Savitch LLP

(57) ABSTRACT

Systems and methods can use client-side video buffer occupancy for enhanced quality of experience in a communication network. The systems and methods provided herein can drive changes in the communication system using control responses. Example control responses include responses for scheduling of packets under capacity constrained conditions. An access node, such as a base station, may transmit video from a server to a client in a user device. The access node can estimate client-side video buffer occupancy and predict video playback stalls. The client-side video buffer occupancy can be estimated by emulating behavior of the client. The buffer occupancy can be used to enhance quality of experience for the user. For example, when the buffer occupancy is low, the access node may increase scheduling priority of packets conveying the video.

37 Claims, 8 Drawing Sheets

Quality of Experience Enhancement Module
621 Control Response Module
626 Congestion Evaluation Module
627 Timing Information Module
628 Buffer Occupancy Estimation Module
625 Detection/Classification Module
610
downstream 601
upstream 603

(56) References Cited

U.S. PATENT DOCUMENTS

2007/0286279 A1* 12/2007 Hamanaka ............... 375/240.12
2008/0198929 A1* 8/2008 Fujihara ................... 375/240.13
2011/0096828 A1* 4/2011 Chen et al. ............... 375/240.02
2011/0116460 A1 5/2011 Kovvali et al.
2012/0110167 A1 5/2012 Joch et al.
2012/0117225 A1 5/2012 Kordasiewicz et al.
2012/0155398 A1 6/2012 Oyman et al.
2012/0257671 A1* 10/2012 Brockmann et al. ..... 375/240.02
2012/0317308 A1* 12/2012 Penner et al. ................. 709/239
2013/0041998 A1 2/2013 Kordasiewicz et al.
2014/0219082 A1* 8/2014 Geijer ........................... 370/229

OTHER PUBLICATIONS

Singh et al. "Video Capacity and QoE Enhancements over LTE." Presented at IEEE International Conference on Communications, Jun. 15, 2012, 20 pages.

* cited by examiner

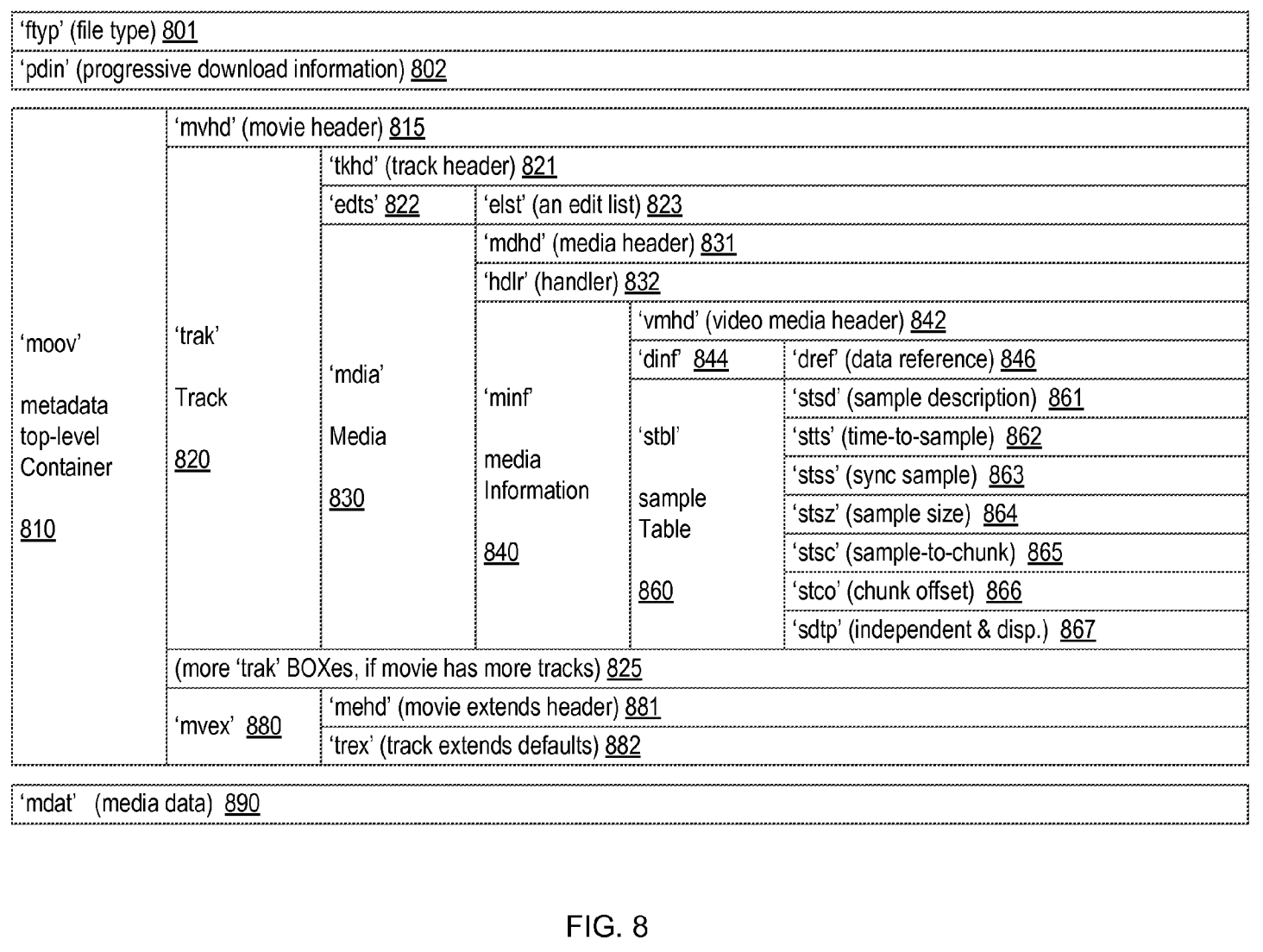

'ftyp' (file type) 801

'pdin' (progressive download information) 802

'moov' metadata top-level Container 810

'mvhd' (movie header) 815

'trak' Track 820

'tkhd' (track header) 821

'edts' 822

'elst' (an edit list) 823

'mdia' Media 830

'mdhd' (media header) 831

'hdlr' (handler) 832

'minf' media Information 840

'vmhd' (video media header) 842

'dinf' 844

'dref' (data reference) 846

'stbl' sample Table 860

'stsd' (sample description) 861

'stts' (time-to-sample) 862

'stss' (sync sample) 863

'stsz' (sample size) 864

'stsc' (sample-to-chunk) 865

'stco' (chunk offset) 866

'sdtp' (independent & disp.) 867

(more 'trak' BOXes, if movie has more tracks) 825

'mvex' 880

'mehd' (movie extends header) 881

'trex' (track extends defaults) 882

'mdat' (media data) 890

FIG. 8

SYSTEMS AND METHODS FOR USING CLIENT-SIDE VIDEO BUFFER OCCUPANCY FOR ENHANCED QUALITY OF EXPERIENCE IN A COMMUNICATION NETWORK

RELATED APPLICATIONS

This application claims the benefit of U.S. provisional patent application Ser. No. 61/658,854, filed Jun. 12, 2012 and titled "Congestion Evaluation using Estimated Client-Side Video Stream Buffer Occupancy," which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention generally relates to the field of communication systems and more specifically to systems and methods for using estimated client-side video buffer occupancy for enhanced quality of experience in a communication network.

In a communication network, the rate at which data can be effectively transported between the various nodes in the network is limited. In a wired network, the limitation is often a function of equipment capability. For example, a gigabit Ethernet link can transport no more than one billion bits per second. In a wireless network, the limitation is often a function of channel bandwidth and the transmission technology and communication protocols used. A wireless network is further constrained by the amounts of spectrum allocated for particular services and areas and the quality of the signals between transmitting and receiving nodes. Additionally, the rates at which data can be transported in a wireless network often vary over time.

The demand for communication continues to increase. When demand for communication approaches or exceeds the capacity of the communication network, users are likely to experience delays or interruptions in their communication services. How delays or interruptions effect the users can vary between users, for example, depending on the type of data to be communicated. For example, delay in transporting data for a streaming video would be expected to substantially lower the quality of a user's experience relative to delay in transporting data for an email message.

SUMMARY

Systems and methods for using estimated client-side video buffer occupancy for enhanced quality of experience in a communication network are provided. The systems and methods provided herein can drive changes in a communication system using control responses. Example control responses include scheduling of packets and intelligent discard of packets under capacity constrained conditions. An access node, such as a base station, may transmit video from a server to a client in a user device. The access node can estimate or predict client-side video buffer occupancy. The client-side video buffer occupancy can be predicted by emulating the behavior of the client. The buffer occupancy can be used to enhance quality of experience for the user. For example, when the buffer occupancy is low, the access node may increase scheduling priority of packets conveying the video.

In an aspect, the invention provides an access node, including: a transceiver module configured to communicate with a terminal node; a backhaul interface module configured to provide communications with a video server; a quality of experience enhancement module configured to estimate occupancy of a video buffer in the terminal node; and a scheduler module configured to receive downlink packets via the backhaul interface module and schedule the downlink packets for transmission by the transceiver module utilizing scheduler parameters, the scheduler parameters based at least in part on the estimated occupancy of the video buffer in the terminal node.

In an aspect, the invention provides an access node, comprising: a transceiver module configured to communicate with a terminal node; a backhaul interface module configured to provide communications with a content server; a processor coupled to the transceiver module and the backhaul interface module, the processor arranged for receiving packets from the backhaul interface module, some of the packets containing a video stream for delivery to the terminal node, inspecting the received packets to determine information about the video stream, and estimating occupancy of a video buffer in the terminal node using the information about the video stream.

In an aspect, the invention provides a method for use in operating an access node that transmits and receives packets to and from a terminal node to provide communications with the terminal node, the packets including packets conveying a video stream, the method comprising: receiving packets associated with the video stream; inspecting the packets to determine characteristics of the video stream; estimating which packets conveying the video stream have been delivered to the terminal node; and estimating occupancy of a video buffer in the terminal node using the characteristics of the video stream and information about which of the packets conveying the video stream have been delivered to the terminal node.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 8 is a diagram of a data structure of a video file in accordance with aspects of the invention.

DETAILED DESCRIPTION

Systems and methods for communication systems that use estimated, or predicted, client-side video buffer occupancy to enhance users' quality of experience (QoE) are provided. Information about client-side video buffer occupancy may, for example, be used in control functions for scheduling communication between user equipment and base stations (or other network nodes). Information about client-side video buffer occupancy may, for example, be derived from information about what video data has been received by the client and an estimated playback time position of the video at the client. The systems and method are particularly useful in capacity constrained, multiple-access communication systems.

The systems and methods disclosed herein can be applied to various communication systems, including wireline and wireless technologies. For example, the systems and methods disclosed herein can be used with Cellular 2G, 3G, 4G (including Long Term Evolution (LTE), LTE Advanced, and WiMAX), cellular backhaul, Wi-Fi, ZigBee, Bluetooth, Ultra Mobile Broadband (UMB), digital subscriber line (DSL), multimedia over coax alliance (MoCA), Ethernet, cable modem, and other point-to-point or point-to-multipoint wireline or wireless technologies. For concise exposition, various embodiments are described using terminology and organization from particular technologies and standards. However, the systems and methods described herein are broadly applicable to other technologies and standards.

Figure 1:
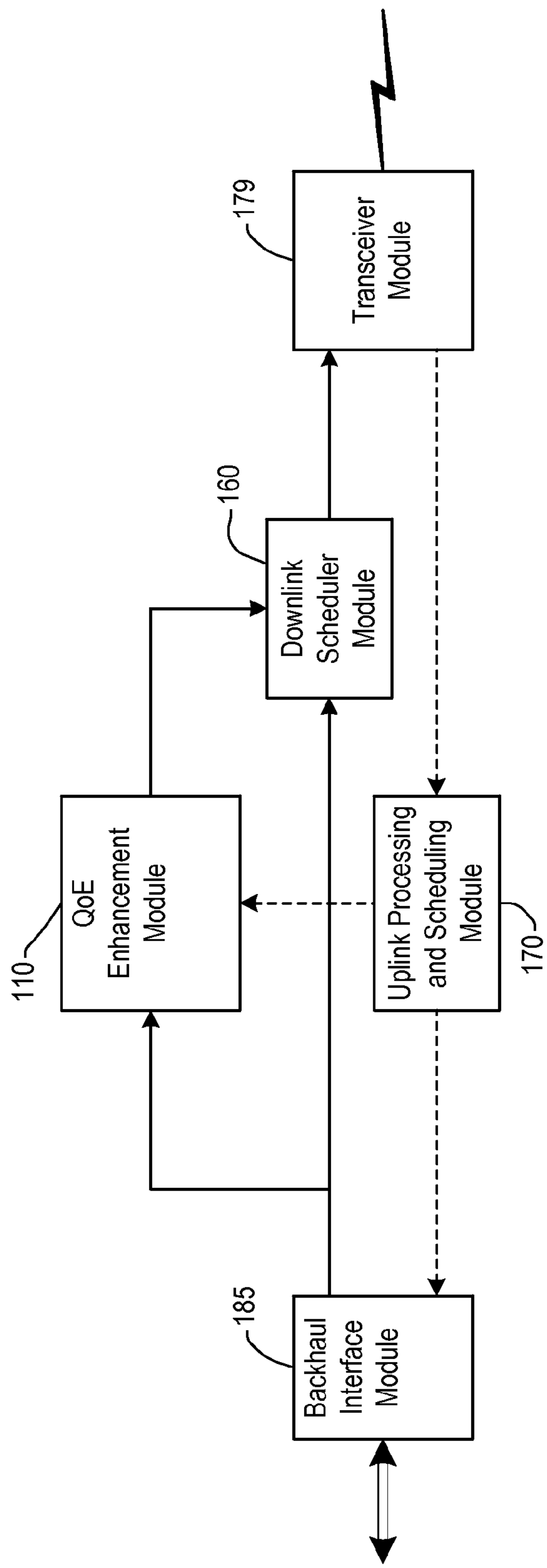
FIG. 1 is a block diagram of aspects of an access node in accordance with aspects of the invention.

FIG. 1 is a block diagram of aspects of an access node in accordance with aspects of the invention. The access node of FIG. 1 facilitates communication between terminal nodes (e.g., cellular phones, smart phones, mobile WiMAX subscriber stations, tablets, notebook and personal computers, and televisions) and devices in a service provider or core network and devices coupled to the network (e.g., devices accessed via the Internet such as video servers). The access node may be, for example, a mobile WiMAX base station, a global system for mobile (GSM) wireless base transceiver station (BTS), a Universal Mobile Telecommunications System (UMTS) NodeB, an LTE evolved Node B (eNB or eNodeB), a cable modem termination system, or other wireline or wireless access node of various form factors.

A terminal node may, for example, request video data from a video server with the access node receiving the request from the terminal node and relaying the request onward to the video server. Similarly, when the requested video data arrives at the access node, the access node transmits the video data to the terminal node. To aid in understanding, in FIG. 1, solid lines represent downlink data and dashed lines represent uplink data. The terms downlink and uplink refer to directions toward and away from a terminal node, respectively.

Video server generally refers to hardware, software, or a combination of hardware and software that provides video content. Video client generally refers to hardware, software, or a combination of hardware and software that receives video content from a video server. A video server, for example, can be an HTTP video streaming server, which stores video files and streams the video files to a video client upon requests from the video client following a particular HTTP video streaming protocol, for example, MPEG DASH (Dynamic Adaptive Streaming over HTTP). In another example, a video server can be a real time streaming protocol (RTSP) video streaming server, which stores video files and streams the video files to a video client upon requests from the video client following the RTSP/RTP protocol. In another example, a video server can be any device acting as a video source in a peer-to-peer video streaming application. In a content delivery network, often a cluster of computers serve the role of a video server.

The access node includes a transceiver module 179 for communication with terminal nodes. The transceiver module 179 includes modules appropriate for the methods used for communication with the terminal nodes. For example, in an embodiment of an LTE base station (eNodeB), the transceiver module 179 includes circuitry such as radio-frequency modulators, demodulators, amplifiers, and tuners.

The access node includes a backhaul interface module 185 for communication with other network nodes. For example, the backhaul interface module 185 may directly provide communication to a router or gateway device that can provide communication with still other network nodes and servers coupled to the network nodes. The backhaul interface module 185 includes modules appropriate for the methods used for communication with the other network nodes. For example, in an LTE base station embodiment that uses Ethernet backhaul, the backhaul interface module 185 may include a gigabit Ethernet transceiver.

Communications received via the transceiver module 179 may be transmitted from the access node via the backhaul interface module 185. Similarly, communications received via the backhaul interface module 185 may be transmitted from the access node via the transceiver module 179.

The access node includes a downlink scheduler module 160 for use in scheduling transmission of data received from the backhaul interface module to one or more terminal nodes via the transceiver module 179. The access node includes an uplink processing and scheduling module 170 for use in scheduling and processing transmissions from one or more terminal nodes received via the transceiver module 179 for transmission on the backhaul by the backhaul interface module 185. For clarity and brevity, some descriptions will describe communication with a single terminal node and a single uplink device. The access node will generally communicate with many terminal nodes and uplink devices concurrently.

The downlink scheduler module 160 receives packets from the backhaul interface module 185 and places the packets in one or more queues. The queues hold the packets until they are transmitted, discarded, or otherwise removed from the queues. The downlink scheduler module 160 may also include a scheduling control module that determines when packets are removed from the various queues for transmission. The scheduling control module can, for example, use a weighted round robin or a proportional fair queuing method with a scheduling parameter (e.g., a weight) associated with each of the queues. The uplink processing and scheduling module 170 may use a scheduling method similar to or the same as that used by the downlink scheduler module 160. Additionally, the uplink processing and scheduling module 170 may perform processing similar to the QoE enhancement module 110 for uplink traffic.

The access node includes a quality of experience (QoE) enhancement module 110. The QoE enhancement module 110 can be used to improve the QoE for users of terminal devices that communicate with the access node of FIG. 1.

The QoE enhancement module 110 receives downlink packets from the backhaul interface module 185. The QoE enhancement module 110 may also receive uplink packets or information about the uplink packets via the uplink processing and scheduling module 170 or the transceiver module 179.

The QoE enhancement module 110 can inspect packets to determine information about the contents of the packets. The information may be, for example, an application class and specific application associated with a packet. Further information about the applications may also be determined. For example, for video applications, the further information may include a video format, a bit rate, a video resolution, a player state, a frame rate, and playback status.

The QoE enhancement module 110 can evaluate congestion. Communication congestion can occur in many locations in a communication network. The QoE enhancement module 110 may, in particular, evaluate congestion affecting communication between the access node and terminal nodes. Congestion can occur when demand for communication exceeds capacity for communication. The QoE enhancement module 110 may use, for example, information about packet arrival rates, throughput delays, and resource utilization in congestion evaluation.

The QoE enhancement module 110 can use the packet information and congestion information in making control responses. For example, the QoE enhancement module 110 may supply scheduler parameters to the downlink scheduler module 160. The scheduler parameters can be set to modify QoE.

The QoE enhancement module 110, in addition to utilizing locally available information, such as queue occupancies, queuing delays, packet drop rates, and egress rates, can assess user QoE for applications at the terminal nodes. In an embodiment, the QoE enhancement module 110 may enhance QoE for applications with video delivery. Video data has characteristics that differ from characteristics of many other data, such as email or data used with web browsing. Video data, in particular, is consumed according to specific timing. If video data is not timely delivered to its destination, a video session playing back the video will freeze. In this case, impact on the Quality of Experience for the video session is much greater than what a similar delay may cause with other types of data. Thus the QoE enhancement module 110 may consider timing needs for video delivery.

As an example of operation of the QoE enhancement module 110, consider a video delivery application where the access node relays video data from a video server to a video client at a terminal node. The number and duration of video freezes can be used a measure of a user's quality of experience for video delivery. The video freezes occur when a video buffer at the client device is empty or lacks the complete data needed for decoding. The access node can estimate what data is in the client-side video buffer. The QoE enhancement module 110 may emulate operation of the client's behavior to estimate client-side video buffer occupancy. The QoE enhancement module 110 may use the estimated client-side video buffer occupancy to predict video freezes. Emulated aspects of the client's behavior may include estimating how much of the video has been decoded, that is, what is the decoding time. The decoding time corresponds to the position in a video stream where the client consumes (e.g., reads from a buffer) the video data. The decoding time is not necessarily the same as the presentation time (when the data is displayed) of the video data. The decoding time may also be referred to as the playback time since the decoding is often performed for playback. Uplink and downlink packets may be used for emulation. The contents of the packets and their timing can be used as well.

Although FIG. 1 illustrates single instances of each module, in an embodiment, there may be multiple instances of various modules. For example, the access node may include multiple backhaul interface modules. Similarly, the access node may include multiple transceiver modules. The multiple backhaul interface modules and transceiver modules may operate according to different protocols.

FIG. 1 illustrates an access node for a particular allocation of functions to various modules and a particular distribution of modules in various communication nodes. Many other arrangements may also be used. For example, all or parts of the QoE enhancement module 110 could be in a gateway node in a core network.

Figure 2:
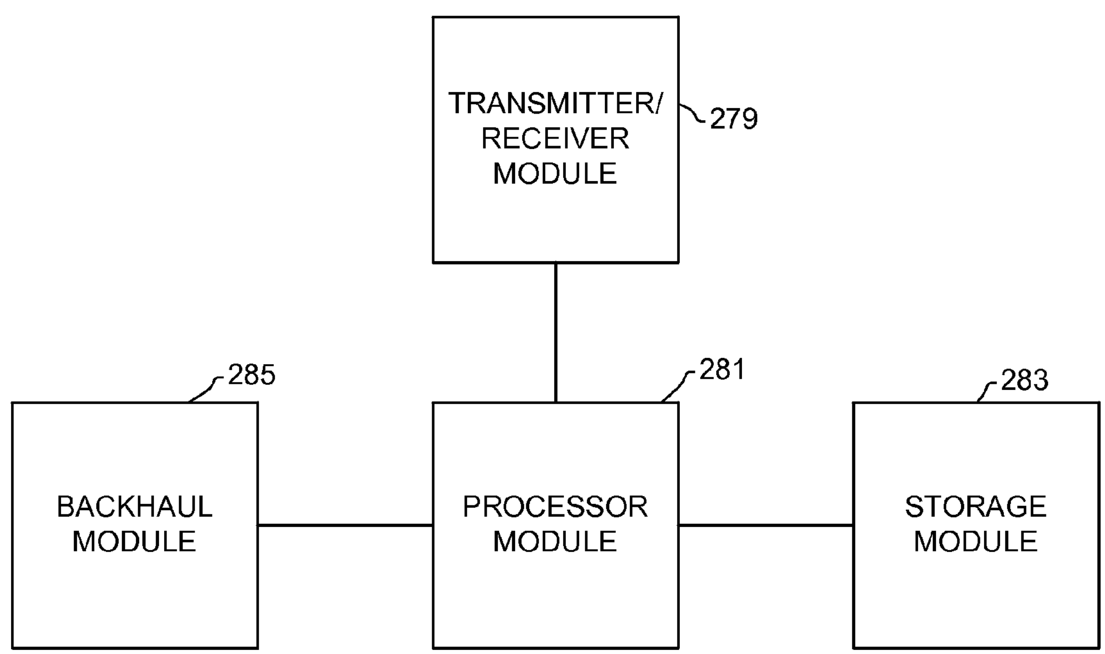
FIG. 2 is a functional block diagram of an access node in accordance with aspects of the invention.

FIG. 2 is a functional block diagram of an access node in accordance with aspects of the invention. The access node of FIG. 1 may be implemented, for example, using the access node of FIG. 2. In various embodiments, the access node of FIG. 2 may be a mobile WiMAX base station, a global system for mobile (GSM) wireless base transceiver station (BTS), a Universal Mobile Telecommunications System (UMTS) NodeB, an LTE or LTE Advanced evolved Node B (eNB or eNodeB), a cable modem head end, or other wireline or wireless access node of various form factors.

The access node includes a processor module 281. The processor module 281 is coupled to a transmitter-receiver (transceiver) module 279, a backhaul interface module 285, and a storage module 283.

The transmitter-receiver module 279 is configured to transmit and receive communications with other devices. In many embodiments, the communications are transmitted and received wirelessly. In such embodiments, the access node generally includes one or more antennas for transmission and reception of radio signals. In other embodiments, the communications are transmitted and received over physical connections such as wires or optical cables. The communications of the transmitter-receiver module 279 may be with terminal nodes.

The backhaul interface module 285 provides communication between the access node and a core network. The communication may be over a backhaul connection. Communications received via the transmitter-receiver module 279 may be transmitted, after processing, on the backhaul connection. Similarly, communication received from the backhaul connection may be transmitted by the transmitter-receiver module 279. Although the access node of FIG. 2 is shown with a single backhaul interface module 285, other embodiments of the access node may include multiple backhaul interface modules. Similarly, the access node may include multiple transmitter-receiver modules. The multiple backhaul interface modules and transmitter-receiver modules may operate according to different protocols.

The processor module 281 can process communications being received and transmitted by the access node. The storage module 283 stores data for use by the processor module 281. The storage module 283 may also be used to store computer readable instructions for execution by the processor module 281. The computer readable instructions can be used by the access node 275 for accomplishing the various functions of the access node. In an embodiment, the storage module 283 or parts of the storage module 283 may be a non-transitory machine readable medium. For concise explanation, the access node or embodiments of it are described as having certain functionality. It will be appreciated that in some embodiments, this functionality is accomplished by the processor module 281 in conjunction with the storage module 283, transmitter-receiver module 279, and backhaul interface module 285. Furthermore, in addition to executing instructions, the processor module 281 may include specific purpose hardware to accomplish some functions.

The access node may perform operations to enhance user quality of experience. For example, the access node may inspect and analyze packets related to video delivery to estimate occupancy of a video buffer in a client device and use the estimated occupancy in scheduling control responses. QoE enhancement may be a module provided, for example, by the processor module 281 using instructions from the storage module 283.

Figure 3:
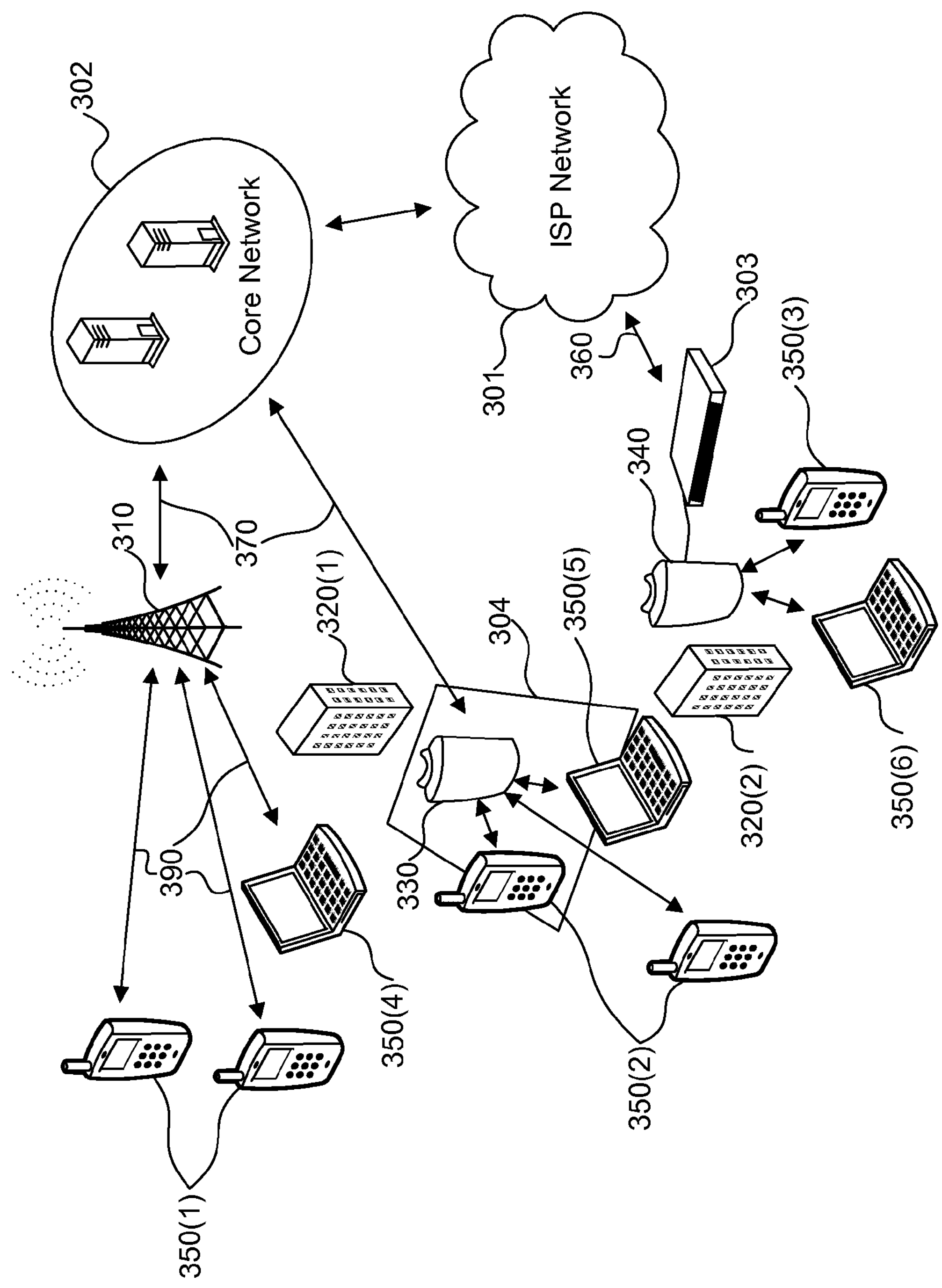
FIG. 3 is a block diagram of a communication network in which systems and methods can be implemented in accordance with aspects of the invention.

FIG. 3 is a block diagram of a communication network in which systems and methods disclosed herein can be implemented in accordance with aspects of the invention. A macro base station 310 is connected to a core network 302 through a backhaul connection 370. In an embodiment, the backhaul connection 370 is a bidirectional link or two unidirectional links. The direction from the core network 302 to the macro base station 310 is referred to as the downstream or downlink (DL) direction. The direction from the macro base station 310 to the core network 302 is referred to as the upstream or uplink (UL) direction.

Subscriber stations 350(1) and 350(4) can connect to the core network 302 through the macro base station 310. Wireless links 390 between subscriber stations 350 and the macro base station 310 are bidirectional point-to-multipoint links, in an embodiment. The direction of the wireless links 390 from the macro base station 310 to the subscriber stations 350 is referred to as the downlink or downstream direction. The direction of the wireless links 390 from the subscriber stations 350 to the macro base station 310 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 350 access content over the wireless links 390 using base stations, such as the macro base station 310, as a bridge. That is to say, the base stations generally pass user application data and any user application control messages between the subscriber stations 350 and the core network 302 without the base station being a destination for the data and control messages or a source of the messages.

In the network configuration illustrated in FIG. 3, an office building 320(1) causes a coverage shadow 304 which cannot be reached by the macro base station 310. A pico station 330 can provide coverage to subscriber stations 350(2) and 350(5) in the coverage shadow 304. The pico station 330 is connected to the core network 302 via a backhaul connection 370. The subscriber stations 350(2) and 350(5) may be connected to the pico station 330 via links that are similar to or the same as the wireless links 390 between subscriber stations 350(1) and 350(4) and the macro base station 310.

In an office building 320(2), an enterprise femtocell 340 provides in-building coverage to subscriber stations 350(3) and 350(6). The enterprise femtocell 340 can connect to the core network 302 via an internet service provider network 301 by utilizing a broadband connection 360 provided by an enterprise gateway 303. A similar arrangement of devices may be used in a residential environment.

The macro base station 310, the pico station 330, or the enterprise femtocell 340 of FIG. 3, in some embodiments, are implemented using the access node of FIG. 1 or the access node of FIG. 2.

Devices in the network of FIG. 3 (such as the macro base station 310, the pico station 330, the enterprise gateway 303, the enterprise femtocell 340, devices in the core network 302, and devices in the internet service provider network 301) may operate, individually or in combination, to enhance user quality of experience. For example, the devices may inspect and analyze packets related to video delivery to estimate occupancy of a video buffer in one of the subscriber stations 350 and use the estimated occupancy in scheduling control responses. The video buffer occupancy may, for example, be estimated in one device and communicated to a second device that uses the estimated video buffer occupancy for scheduling.

Figure 4:
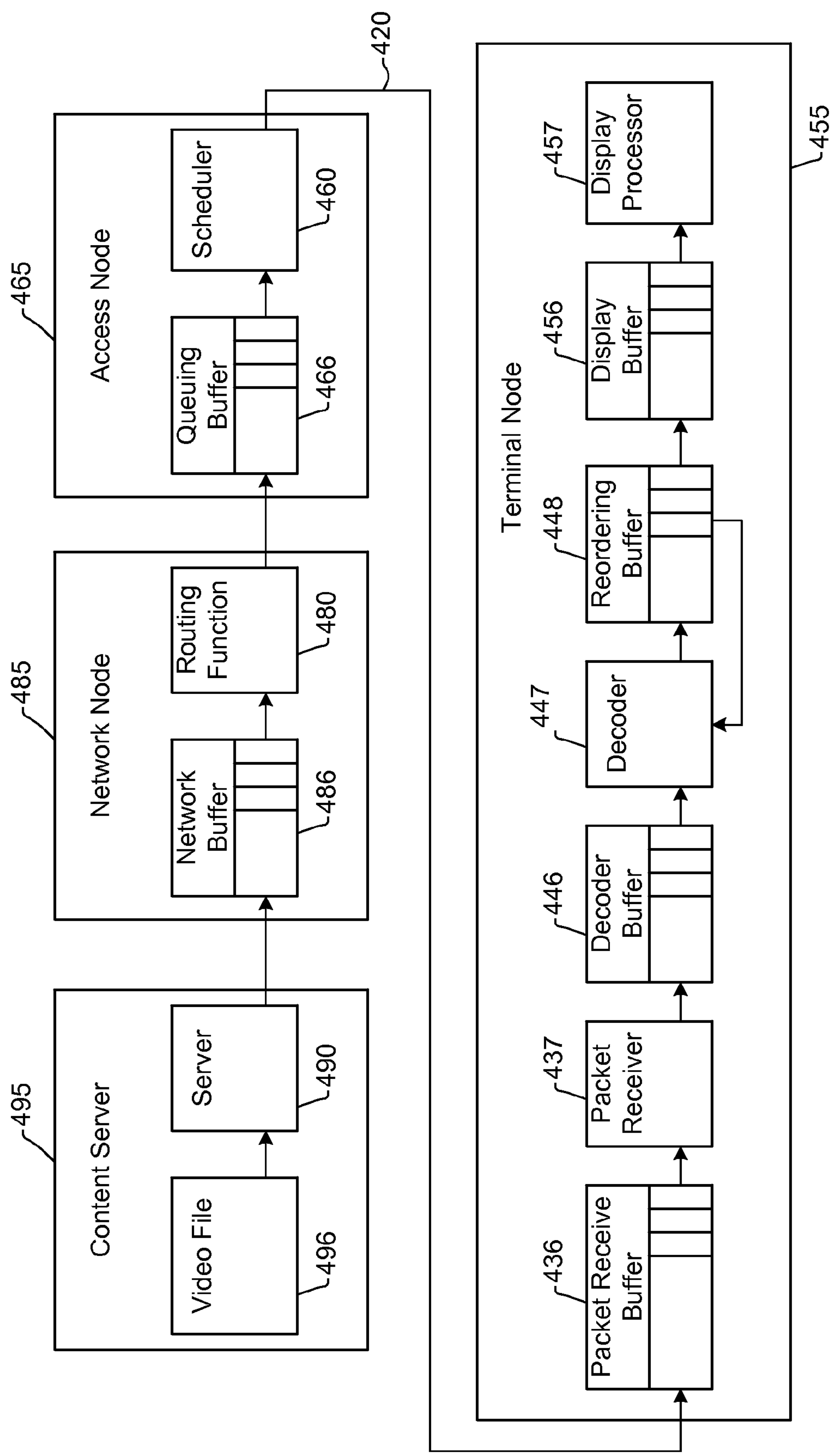
FIG. 4 is a diagram of video delivery in a communication network in accordance with aspects of the invention.

FIG. 4 is a diagram of video delivery in a communication system in accordance with aspects of the invention. Video is delivered from a content server 495 to a terminal node 455 via a network node 485 and an access node 465. The video data is generally delivered in a compressed format and decompressed at the terminal node 455. The video delivery illustrated in FIG. 4 can be performed in the communication network of FIG. 3 with the terminal node 455 of FIG. 4 corresponding to one of the subscriber stations 350 of FIG. 3, the access node 465 of FIG. 4 corresponding to the macro base station 310, the pico station 330, or the enterprise femtocell 340 of FIG. 3, the network node 485 of FIG. 4 corresponding to the enterprise gateway 303, a device in the core network 302, or a device in the internet service provider network 301 of FIG. 3, and the content server 495 of FIG. 4 corresponding to a device coupled to the core network 302 or the internet service provider network 301 of FIG. 3. The terminal node 455 may be termed a client according to its relationship to the content server 495. The content server 495 may include a network of separately located servers. Various elements of the communication system may be the same or similar to like named elements described above. The communication system is illustrated in simplified form. For example, many communication systems will include many interconnected network nodes.

The terminal node 455 in the communication system shown in FIG. 4 communicates with the access node 465 over a radio link 420. The access node 465 is connected to the network node 485. The network node 485 provides access to the content server 495. A system may include intermediary devices between those shown. For example, a router node may provide connectivity to the Internet to which the content server 495 is also connected.

Buffering is used at many points in the video delivery. Buffering can smooth variable instantaneous communication rates to a longer-term average rate. The rate at which the video data can be communicated in a network can be highly variable. For example, communication to a given node in a multiple access network may vary from zero to a high rate depending on a current allocation of resources. Some communications may be intentionally bursty, for example, to save energy in battery powered nodes. Buffering can also smooth variable rate demands. The rate at which the video data needs to be supplied can also be highly variable. For example, in many video compression methods, the information for some frames (which usually correspond to equal time intervals) is represented with many more data bits than other frames. Buffering can help compensate for limited processing power and outgoing bandwidth at each node. Temporary storage in buffers can help avoid performance impacts from communication interruptions to the ingress of the buffer. For example, consider a buffer with a constant ingress and egress rate of 1 megabit per second (Mbps). If the buffer contains 1 megabit of stored data, then a communication interruption on the ingress may occur for up to 1 second without impacting data transmitted on the egress. The content server 495 delivers video from a video file 496. The video file 496 may be stored, for example, on a networked storage array. Based upon a client request, a server 490 reads video data from the video file 496 and transmits the data toward the terminal node 455. Alternatively, the delivered video may be dynamically generated while it is being requested. For example the delivered video may be of a live event. For another example, the delivered video may be dynamically generated from a static file based on particular user requirements, such as video resolution, video frame rate, or video data rate.

The network node 485 buffers video data from the content server 495 in a network buffer 486. The network buffer 486 stores the video data until a routing function 480 can transmit the data to the access node 465. The network node 485 may be connected to many additional devices. Delay in transmitting the video data from the network buffer 486 can vary, for example, with network traffic between the network node 485 and the additional devices.

The access node 465 buffers the video data received from the network node 485 in a queuing buffer 466. A scheduler module 460 selects data from the queuing buffer 466 to transmit to the terminal node 455. The access node 465 may select the data to transmit in order to enhance quality of experience of users for which the access node 465 provides communications. For example, the access node 465 may use client-side buffer occupancy information to improve quality of experience for a user of the terminal node 455. In addition to using buffer occupancy information for scheduling, the information may also be used, for example, in admission control and system administration.

The terminal node 455, as illustrated in FIG. 4, includes multiple buffers for the video stream. The buffer may, in an embodiment, be located in shared memory. A packet receive buffer 436 stores data packets containing video data as it is received at the terminal node 455. A packet receiver module 437 manages the packet receive buffer 436. Specific functions performed by the packet receiver module 437 and packet receive buffer 436 may vary with particular protocols used to deliver the video data. For example, when real-time transport protocol (RTP) and user datagram protocol (UDP) are used as the transport technology, the packet receiver module 437 and the packet receive buffer 436 can provide RTP dejitter functionality to compensate for the variation in the delay of packets. When transmission control protocol (TCP) is used as the transport technology, the packet receiver module 437 and packet receive buffer 436 may perform TCP functions including the processing of out-of-order packets, missing packets, and duplicate packets. For example, the packet receiver module 437 can delay delivering a packet to the subsequent stage if any packet with a smaller sequence number has not been delivered.

The video decoding, for example, decompressing video data in an MPEG-4 AVC format, is performed by a decoder module 447. The decoder module 447 uses a decoder buffer 446 and a reordering buffer 448. Video data in the decoder buffer 446 is in a compressed format. Video data in the reordering buffer 448 is in a decompressed format, for example, raster data. A group of decoded or uncompressed video data which can be displayed as a single, human-viewable image is termed a video frame. A video sample is the compressed or encoded form of a video frame.

The decoder module 447 stores video data in the decoder buffer 446 to assure that there is sufficient data available for decoding. The decoder buffer 446 may be referred to as a bitstream buffer. The decoder buffer 446 may compensate for the highly variable bit rate associated with video. The decoder buffer 446 may also store additional data if the data arrives at the terminal node 455 faster than necessary for operation of the decoder module 447. The additional data may be used in compensating for fluctuation in the network bandwidth. For example, even if the network bandwidth falls below what is needed for transporting a video stream for a certain duration, there may be sufficient data in the decoder buffer 446 to supply data to the decoder module 447 until the network bandwidth recovers.

The decoder module 447 stores decoded frames of video in the reordering buffer 448. Many video compression methods include some frames that are decoded based on data in subsequent (in display order) frames. Accordingly, the reordering buffer 448 provides temporary storage for frames that are processed out of order (not in the sequence that frames will be displayed).

Decoded video frames are supplied from the reordering buffer 448 to a display buffer 456. A display processor 457 reads the frames from the display buffer 456, performs necessary processing, and supplies appropriate signals to a display, for example, a liquid crystal display. The display buffer 456, in an embodiment, stores all or parts of two frames—the current frame being displayed and the next frame to be displayed. In many embodiments, the display buffer 456 and the reordering buffer 448 are stored in a shared memory.

The value of the video data delivered to the terminal node 455 is time sensitive. That is, if a piece of the data is not available when needed, its value diminishes. For example, if a video frame is not available when it is to be displayed, the terminal node 455 may skip that frame or pause until it is delivered. In either case the terminal node 455 may continue to display ("freeze") the previous frame until a new frame is available. Video data will not be available at a stage in the video delivery if the associated buffer is empty (underflow). The effect of buffer underflow may vary with the point at which it occurs and with the communication protocols used to convey the data.

If one of the buffers at the terminal node 455 underflows, the video playback may eventually freeze. For example, if the packet receive buffer 436 is empty, it will not be able to supply further data for the decoder buffer 446; if the decoder buffer 446 is empty, it will not be able to supply further data to the decoder module 447 that will be placed in the reordering buffer 448; if the reordering buffer 448 is empty, it will not be able to supply further data to the display buffer 456 and the display processor 457 will freeze the display because a new frame will not be available.

If a buffer in the network node 485 or the access node 465 underflows, a video freeze at the terminal node 455 does not necessarily follow. For example, if the network buffer 486 underflows it means that the network node 485 was able to deliver packets before a subsequent packet arrives. This may only indicate that the network node 485 is not congested, not necessarily that packets are being delivered late.

The buffers could also overflow. Buffer overflow in the network node 485 or the access node 465 will result in packet loss. The effect of buffer overflow may vary with the point at which it occurs and with the communication protocols used to convey the data. For UDP based communication, packet loss will eventually be seen by the client as video quality degradation. For TCP based communication, any lost packets containing a TCP segment will be retransmitted so the packet loss results in lower throughput and longer latency. This may lead to a freeze if the retransmitted packet is not received by the client in time.

If one of the buffers in the terminal node 455 overflows, video data will be lost. This may happen when the client application cannot process data fast enough. Data lost due to buffer overflow in the terminal node 455 can also result in video quality degradation. Video clients are generally designed to stop feeding data to a buffer once the buffer occupancy reaches some limit. Since decompressed video data occupies much more space than compressed video data, buffers that store decompressed data (such as the reordering buffer 448 and the display buffer 456) are usually kept as small as possible while sufficient for normal operations. Any unconsumed video data are often stored in compressed format in the decoder buffer 446 after the video data have gone through any processing by the packet receiver module 437.

The decoder module 447 fetches the data from the decoder buffer 446 according to the decoding time of the video data. The decoding time of a particular frame may be called a decoding time stamp (DTS). The DTS may also be referred to as the value of a DTS field. If the video data for a frame arrives after its DTS, the decoder module 447 may not be able to generate a new video frame on time, and this may eventually lead to a video freeze. If the decoder buffer 446 cannot accept any data, the client will stop requesting data from the server.

The occupancies of the various buffers are interrelated. For example, congestion at a point can cause the buffers that are before that point in the video delivery to overflow and cause the buffers that are after that point in the video delivery to underflow. For example, buffer overflow in the access node 465 and buffer underflow in the terminal node 455 can both occur when the communication network cannot transfer data fast enough to the video player on terminal node 455.

Detecting when the video freezes locally in the terminal node 455 may not be particularly difficult. For example, the video player providing the playback will have the necessary information related to video freezes. However, detecting video freeze events occurring in the client from a remote network node, such as the access node 465, is difficult. The methods and systems described herein can be used to estimate the occupancy of buffers in the terminal node 455. Information about the occupancy of the buffers can be used to predict freeze events. Information about the freeze events can be used to enhance quality of experience for uses of the communication network. For example, the access node 465 may use the information in determining scheduling priorities.

A communication system could schedule video data with a high priority to avoid video freezes. This may not be practical. Video data is a major component of mobile traffic and is likely to become even more prevalent in the future. Always transporting video ahead of other traffic may also be unnecessary. Additionally, delivering excessive amount of video data can result in wasted bandwidth. For example, if the user decides to terminate the video playback session before all of the downloaded video data are consumed.

Communication networks use layers of protocols to abstract the functions of one layer from those provided by another layer. Abstraction of layers can allow greater portability of applications to different networks. Initiation and subsequent termination of flows of packets in a network may be triggered by particular applications or services. A flow of control and user data packets relating to the use of an end-user application or service is termed a session.

Networked servers, such as content servers or proxy servers, and terminal nodes, such as smart phones, tablets, or laptop computers, may initiate or participate in a session. Networked servers and terminal nodes may host one or more sessions simultaneously. The sessions may be independent from one another or related to each other. A session may be established between two nodes, for example, between a video server and a video client at a terminal node. Alternatively, a session may be established between a video client and multiple video servers. For example, a video client may interact with a cluster of computers acting as a virtual server. Sessions may also be between one node and many nodes through the use of, for example, multicast and broadcast packet protocols.

Sessions may be characterized or categorized by various criteria. One criterion may be a specific application that was initiated by the user and responsible for launching the session. Another criterion may be an application class that describes an overall function served by a particular session.

A session may consist of one or more independent data streams using the same or potentially different underlying connections. The data streams may use, for example, one or more user datagram protocol (UDP) connections or transmission control protocol (TCP) connections.

Aspects of the video delivery of FIG. 4 may vary with the particular protocols used. For example, the video delivery may use hypertext transfer protocol (HTTP) progressive download or HTTP streaming. For HTTP progressive download, a single file is downloaded and played. HTTP is based on TCP, so in-order and reliable delivery of video data is guaranteed. Quality degradation of a progressive download video session caused by network congestion can be due to video freezes when the video data is not delivered on time. Thus, the impact of video freezes can be considered when modifying scheduler parameters to enhance quality of experience for HTTP progressive download.

For HTTP adaptive streaming, a method to enhance quality of experience can consider video freezes when modifying scheduler parameters. Additionally, for HTTP adaptive streaming, the client may detect that available bandwidth is either larger or smaller than the data rate of the video bitstream currently being transported. Accordingly, the client may choose to switch to another video bitstream with a data rate that better matches the available bandwidth.

Video compression takes advantage of the spatial redundancy within video frames, as well as the temporal redundancy between different video frames. Because of the difference between video frames, compressed frame sizes can be very different from frame to frame. For implementation considerations, the video bit rate fluctuation can be quantified. Video buffer models, such as the Video Buffering Verifier (VBV) buffer model and the Generalized Hypothetical Reference Decoder (HRD) buffer model were developed for that purpose.

VBV is a hypothetical decoder defined in MPEG-2 and in MPEG-4 part 2 and is conceptually connected to the output of an encoder to monitor the characteristics of the bitstream generated by an encoder. The model tells how much buffer occupancy fluctuation the decoder should expect if the data transfer rate is equal to a certain value, for example, the average bit rate of video stream.

Each VBV buffer model includes two parameters, a data rate R and a buffer size B. In addition, a VBV delay $\tau(n)$ can specify the latency from the time that the first bit of compressed data of a frame is received in the buffer to the time when a frame is removed from the buffer and decoded. If the data rate R is steady and the decoder removes the nth compressed frame from the buffer according to VBV delay $\tau(n)$, a buffer of size B should never overflow, and the buffer also does not underflow. Another parameter related to the decoder operation is initial buffer delay. This is the time needed to receive the bitstream's global syntax information and the VBV delay of the first frame. For example, the global syntax information may include information such as sequence header and group of picture header in MPEG-2.

An issue with using the VBV buffer model is that the decoder does not operate optimally if it receives data at a rate that differs from the VBV data rate. For example, if the network is able to transfer data at a rate higher than VBV data rate, generally the initial buffer delay may be reduced. If the decoder still operates based on the original initial buffer delay, which may be calculated based on a much lower rate, the initial buffer delay will be unnecessarily long for a network having higher bandwidth.

A Generalized Hypothetical Reference Decoder (HRD) model was developed to address this issue. Instead of sending one set of buffer parameters as in VBV buffer model, the HRD model can include buffer parameters for multiple buffer models. Each buffer model provides an optimal buffer size and initial buffer delay for a given data rate. For a network bandwidth that does not fall exactly on one of the data rates specified in the HRD model, a buffer size and initial buffer delay can be interpolated from the buffer models for similar data rates.

A video decoder should minimally have a buffer whose size is equal to the size of video stream buffer specified in the buffer model. The video stream buffer size may be explicitly specified in a bitstream. Alternatively, the video stream buffer size may be derived from the maximum video stream buffer size for a profile and level that the bitstream conforms to.

Each video coding standard can define the maximum video stream buffer size and maximum bit rate for a bitstream conforming to a certain profile at certain level. A profile specifies a collection of coding features and constraints that a bitstream needs to be compliant with. A level specifies limits on coding parameters, such as the frame size, frame rate, and buffer size. In H.264/AVC, for example, the sequence parameter set contains the profile and level that the bitstream conforms to. For level 4.1 (Blue-ray DVD), the standard specifies the maximum Coded Picture Buffer (CPB) (the video stream buffer in H.264) is 62.5 megabits.

Figure 5:
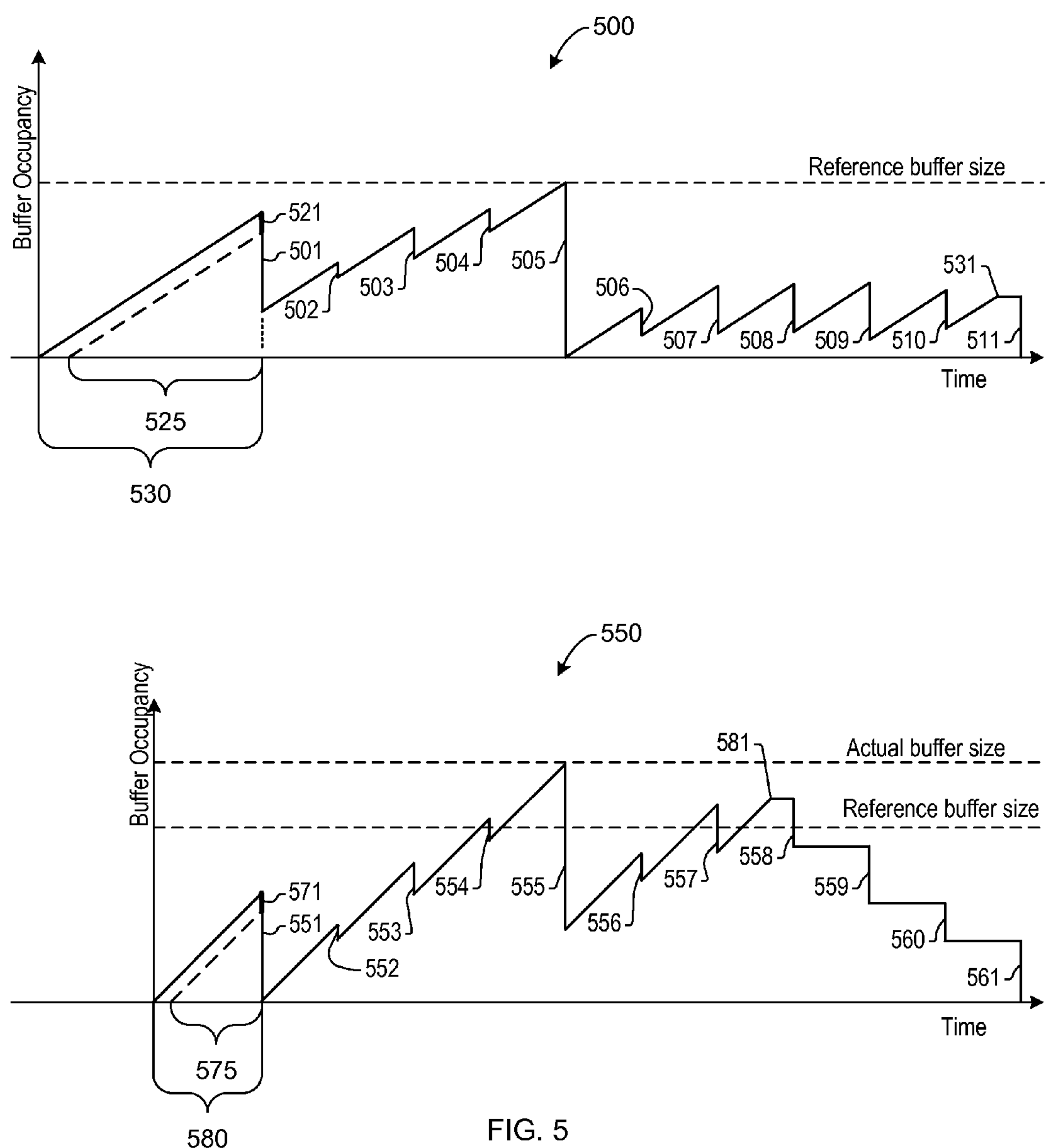
FIG. 5 shows example graphs of video buffer occupancy versus time illustrating aspects of the invention.

FIG. 5 shows example graphs of video buffer occupancy versus time illustrating aspects of the invention. A first graph 500, illustrates video buffer occupancy when data is transferred to a client at a rate equal to the average bit rate of the video. A second graph 550 illustrates video buffer occupancy when data is transferred to a client at a rate greater than the average bit rate of the video. Both examples illustrate cases where the video buffers do not underflow or overflow.

The graphs illustrate constant-rate delivery of the video data to the client. Thus the buffer occupancy ramps up as video data is received by the client. Consistent with the typical hypothetical decoder model, frames are removed from the buffer instantaneously in the graphs of FIG. 5. The video frames are removed at time positions (times 501-511 in the first graph 500 and times 551-561 in the second graph 550) according to their DTSs. Each time a video frame is removed from the buffer, the buffer occupancy steps down. The sizes of the steps vary with the amounts of data in the compressed video frames. For the first frame, additional information 521 in the first graph 500 or additional information 571 in the second graph 550 is required for decoding the first frame and is also removed from the bitstream buffer. The additional information 521, 571 may be, for example, metadata or global syntax information for use in decoding the video frames. In the example of the first graph 500, the first frame at time 501 is an intra-coded frame (I-frame) with a relatively large amount of data and the second, third, and fourth frames at times 502-504 are P-frames, which are predictively encoded, with a smaller amount of data.

The video client will not begin decoding and playing back the video immediately when the first video data is received. The decoding and playback will begin after an initial time latency 530 in the first graph 500, or 580 in the second graph 550. The initial time latency 530, 580 is often called initial buffer delay, T. The initial time latency includes the time spent transferring the additional information 521, 571 and the buffer delay of the first video frame (the buffer delay of the first video frame is shown as time period 525 in the first graph 500 and time period 575 in the second graph 550). The initial buffer delay, T, may be calculated using, for example, the VBV buffer delay of the first frame in the VBV model or the CPB removal delay of the first frame in the H.264 HRD model. An initial buffer occupancy, F, can be calculated from the initial buffer delay and the data rate, R, as $F=T\times R$.

In the first graph 500 of video buffer occupancy versus time where the rate at which data is transferred to the client is equal to the average bit rate of the video, the end of the data transfer 531 occurs near the end of the playback. The buffer size required is referred to as reference buffer size, for example, the VBV buffer size in MPEG-2.

In the second graph 550 of video buffer occupancy versus time where the rate at which data is transferred to the client is greater than the average bit rate of the video, the end of the data transfer 581 occurs substantially before the end of the playback. The actual buffer size used in the second example is also greater than the reference buffer size. Transfer of data to the client faster than the average bit rate of the video may occur, for example, when HTTP progressive download is used. It may also occur in video applications using other video transport protocols, such as HTTP video streaming, in order to store additional data to compensate for the fluctuation in network bandwidth.

When the transfer of data to the client is faster than the average bit rate of the video, the client may need a large buffer to store the data. Although the buffer does not underflow in this situation, the buffer could overflow. This can lead to communication inefficiency for retransmissions of data that could not be buffered.

In many communication systems, the data transfer rate will not be constant. Even when the average data transfer rate is higher than the average bit rate of the video, the instantaneous data transfer rate may fall below the average bit rate of the video. This could cause buffer underflow. A method to avoid buffer underflow is to increase the initial buffer delay and the buffer size. These methods may be inconvenient for the user and costly to implement.

Figure 6:
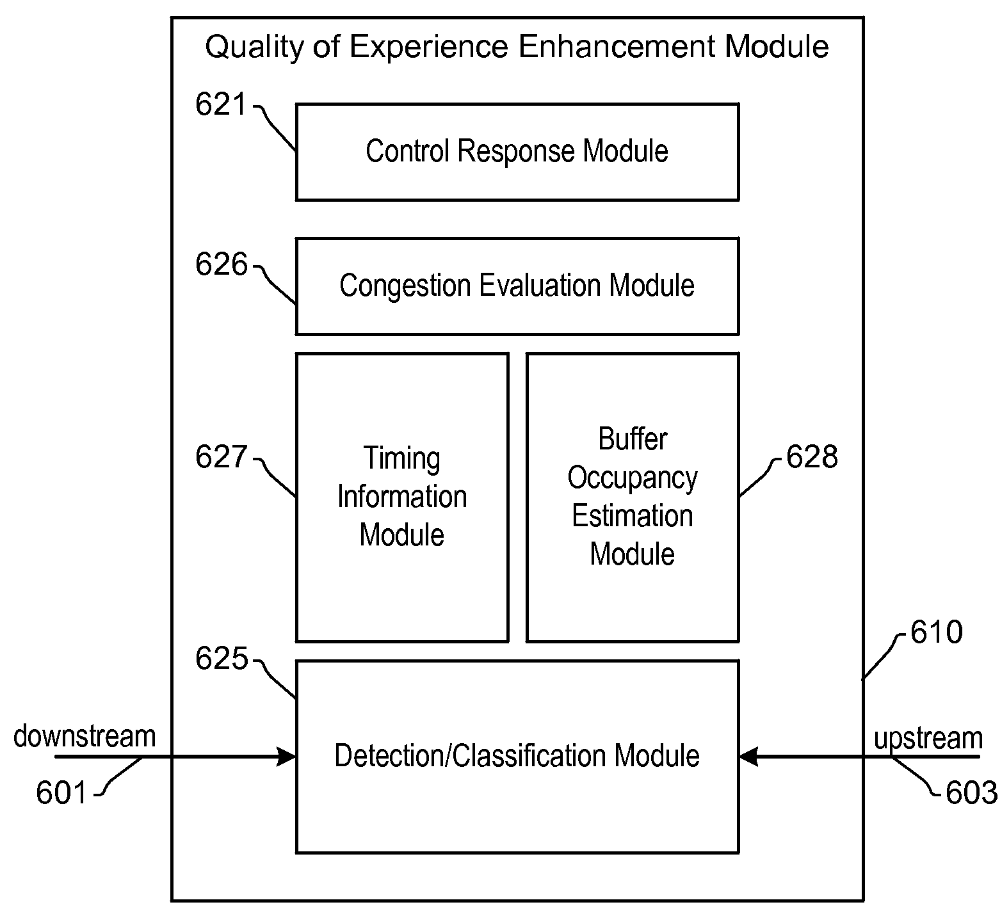
FIG. 6 is a block diagram of a quality of experience enhancement module in accordance with aspects of the invention.

FIG. 6 is a block diagram of a quality of experience (QoE) enhancement module 610 in accordance with aspects of the invention. The QoE enhancement module 110 of the access node of FIG. 1 may, for example, be provided by the QoE enhancement module 610 of FIG. 6.

The QoE enhancement module 610 can analyze downstream packets 601 and upstream packets 603 in a communication node. Based on the analysis, the QoE enhancement module 610 can estimate the video client buffer occupancy of a video session playing in a terminal node and may determine control responses to enhance QoE. For explanatory purposes, operation of the QoE enhancement module 610 at a wireless access node for video delivery will be described in detail. The QoE enhancement module 610 is, however, applicable to other network nodes and may enhance QoE for other services.

To enhance QoE for video delivery, the QoE enhancement module 610 can predict events that impact the video quality experienced by a user of a client device receiving the video. The video quality can be based on video freeze events. Since video freeze events are correlated with buffer occupancy in the client device, the QoE enhancement module 610 can use buffer occupancy information to enhance QoE. The QoE enhancement module 610 can use information about the estimated current playback time at the client and information about what video data has been delivered to the client to estimate buffer occupancy.

The QoE enhancement module 610 includes a detection/classification module 625. The detection/classification module 625 analyzes downstream and upstream packets to detect characteristics of the packets and classify the packets using the detected characteristics. For example, the detection/classification module 625 may characterize the packets by application class and specific application. Systems and methods for detecting characteristics of packets are described in U.S. patent application Ser. No. 13/607,559, filed Sep. 7, 2012 and titled "Systems and Methods for Congestion Detection for use in Prioritizing and Scheduling Packets in a Communication Network," which is hereby incorporated by reference. The detection/classification module 625 may identify some packets for further analysis by other modules. The detection/classification module 625 may, for example, detect packets associated with a particular video stream and pass those packets to a timing information module 627.

The timing information module 627 analyzes packets associated with a video delivery to determine video-related timing information. The timing information module 627 detects various types of timing information. One type of timing information includes parameters associated with the video, such as video buffer model parameters and locations of video samples. Another type of timing information is the time when each video sample should be removed from the client-side video stream buffer and decoded. The timing information module 627 can also estimate the time when various packets are delivered to the client. The timing information module 627 may also detect information about the playback state of the client, such as pauses. Using the information detected by the timing information module 627, a client-side video stream buffer emulator can be constructed to mimic how the client consumes the video data.

Video buffer model parameters are defined at various syntax levels. For example, an H.264 video bitstream may use a generalized hypothetical reference decoder (HRD) buffer model with parameters specified in an HRD Parameters section in the video usability information (VUI) and in a Buffering Period section in the supplemental enhancement information (SEI). Similar parameters may also be specified in the container file format. For example, the progressive download information (pdin) box in ISO (International Organization for Standardization) Base Media File Format (BMFF) specifies multiple pairs of data rate and initial buffer delay. When similar information is presented in the container file level, information at the elementary stream level may be ignored.

A video sample in a container file format is one video frame. The time when a compressed frame should be removed from the video stream buffer and decoded is specified at various syntax levels. For example, an H.264 video bitstream has picture timing SEI that specifies "cpb_removal_delay" to indicate when a compressed video frame (an access unit) needs to be removed from the decoder video stream buffer (Coded Picture Buffer or CPB in H.264 terminology). Similar parameters may also be specified in the container file format. When similar information is presented in the container file level, information at the elementary stream level may be ignored.

The timing information module 627 can estimate what video information has been delivered to the client in various ways. In particular, estimates of client-side buffer occupancy can use information about DTSs of the video samples delivered to the client.

The timing information module 627 may count the video data bytes that are transmitted to the client to estimate the DTS of the most recent video sample transmitted to the client. The DTS of the most recent video sample transmitted to the client can be estimated by dividing the number of bytes transmitted by the average video bitrate. This will be somewhat inaccurate as the instantaneous and average video bit rates differ.

The timing information module 627 can more accurately determine what video samples have been delivered to the client and their corresponding DTSs by decoding the relationship between bytes transmitted, video sample size, and the DTS of each video sample. For example, the timing information module 627 can parse the video metadata to establish a table that can be used to map byte counts to the video samples and the corresponding DTSs of the video samples.

In an access node that handles numerous data connections and simultaneous video streaming sessions, counting the bytes in a video stream may be impractical. For example, performing TCP segment processing (i.e., the handling of out-of-order, lost, and duplicate packets) on all Internet protocol (IP) packets containing TCP segments and parsing the container file metadata may be too costly. Control response decisions, such as scheduling parameters, may not need to change very frequently. Multiple optimization techniques for determining the video sample DTS can be used by the timing information module 627 to take advantage of infrequent control parameter changes.

One optimization is to parse the metadata asynchronously. The QoE enhancement module 610 can store the metadata in a local buffer and parse the metadata in a low priority thread. Before the metadata is parsed, no scheduling decisions that require information from the metadata can be applied. This may be handled by, for example, initially setting the priority of new video sessions to a high value until the metadata is processed. After the metadata is processed, the information can be used in congestion control.

Another optimization is to perform TCP segment processing only on packets containing the metadata and not on the packets containing actual media data (e.g., data in an ISO BMFF mdat box). Similarly, if the video stream is encrypted, the decryption of data may be performed only on the packets containing the metadata and not on the packets containing actual media data. The amount of video data transferred can be more efficiently calculated. The QoE enhancement module 610 may check TCP sequence numbers of the video packets to calculate the amount of video data transferred. The difference between the TCP sequence number of the initial video packet and the TCP sequence number of the most recently transmitted video packet and the payload length of the most recently transmitted video packet can be used to calculate the amount of data transferred. For example, if the TCP sequence number of the initial video packet is $S_0$, the TCP sequence number of the most recently transmitted video packet n is $S_n$, and the payload length of the video packet n is $L_n$, the amount of video data transmitted can be estimated as $V_n=(S_n-S_0)+L_n$. The sequence number in a TCP segment is a 32-bit number, and it will wrap around. Every time a TCP sequence number wrap around happens, 4294967296, which is ($2^{32}$), needs to be added to $V_n$ to get the estimated amount of video data transmitted. In one embodiment, TCP segment reordering issues are ignored. The sequence number of the most recently transmitted video packet is always used even if some video packets before the most recently transmitted video packet are lost. In another embodiment, the TCP sequence numbers are processed so only the sequence number of a TCP segment for which there are no earlier TCP segments missing is used in estimating the amount of video data transmitted.

Alternatively or additionally, the QoE enhancement module 610 may check the acknowledgment number of the TCP segments in the upstream packets 603 for the same TCP connection. The difference between the acknowledgment number in the most recent TCP segment in the upstream packets and the acknowledgment number in the initial TCP segment in the upstream packets can be used to calculate the amount of data transferred in the downstream direction for the same connection. Checking the acknowledgment number of the TCP segments in the upstream packets can be very efficient as the volume of data for the upstream packets 603 can be much less than the volume of data for the downstream packets 601. Thus, the processing effort needed to detect and parse TCP segments in the upstream packets can be much lower than for the downstream packets. Furthermore, the acknowledgment number of a TCP segment in an upstream packet is representative of the data transferred successfully to the client. Impairments, such as packet loss, are thus accounted for when acknowledgment numbers are used. Accuracy of buffer occupancy estimates may thereby be improved. For example, in a TCP connection for transmitting video packets, the first TCP ACK from the client to the server, which acknowledges the receiving of the TCP segment "SYN+ACK" from the server, has the initial acknowledgment number $AN_0$. If another TCP ACK m is received in the upstream packet, and it has acknowledgment number equal to $AN_m$, it can be known that the amount of the data that has been received successfully by the client is $V_m'=AN_m-AN_0$. The acknowledgment number in a TCP segment is a 32-bit number, and it will wrap around. Every time a TCP acknowledgment number wraps around, 4294967296, which is ($2^{32}$), needs to be added to $V_m'$ to get the estimated amount of video data transmitted. TCP ACKs may be detected and processed, for example, by the uplink processing and scheduling module 170.

The QoE enhancement module 610 includes a buffer occupancy estimation module 628. The buffer occupancy estimation module 628 estimates client-side video buffer occupancy using information from the timing information module 627. The buffer occupancy estimation module 628 can operate a client video stream buffer emulator. The emulator mimics the expected behavior of video playback on the client. The emulator may operate differently for different clients. For example, one client may follow the information contained within the video data to decide how to manage the initial buffering period. Another client may decide to buffer 15 seconds worth of video data before it starts decoding and playback regardless what is suggested in the video data. The type of client may be signaled in the request message sent from the client to the server. In one embodiment, the timing information module 627 stores the behavior of well-known clients. The timing information module 627 may detect the client type by inspecting the messages sent from the client to the server and apply the client behavior in the operation of the emulator.

Figure 7:
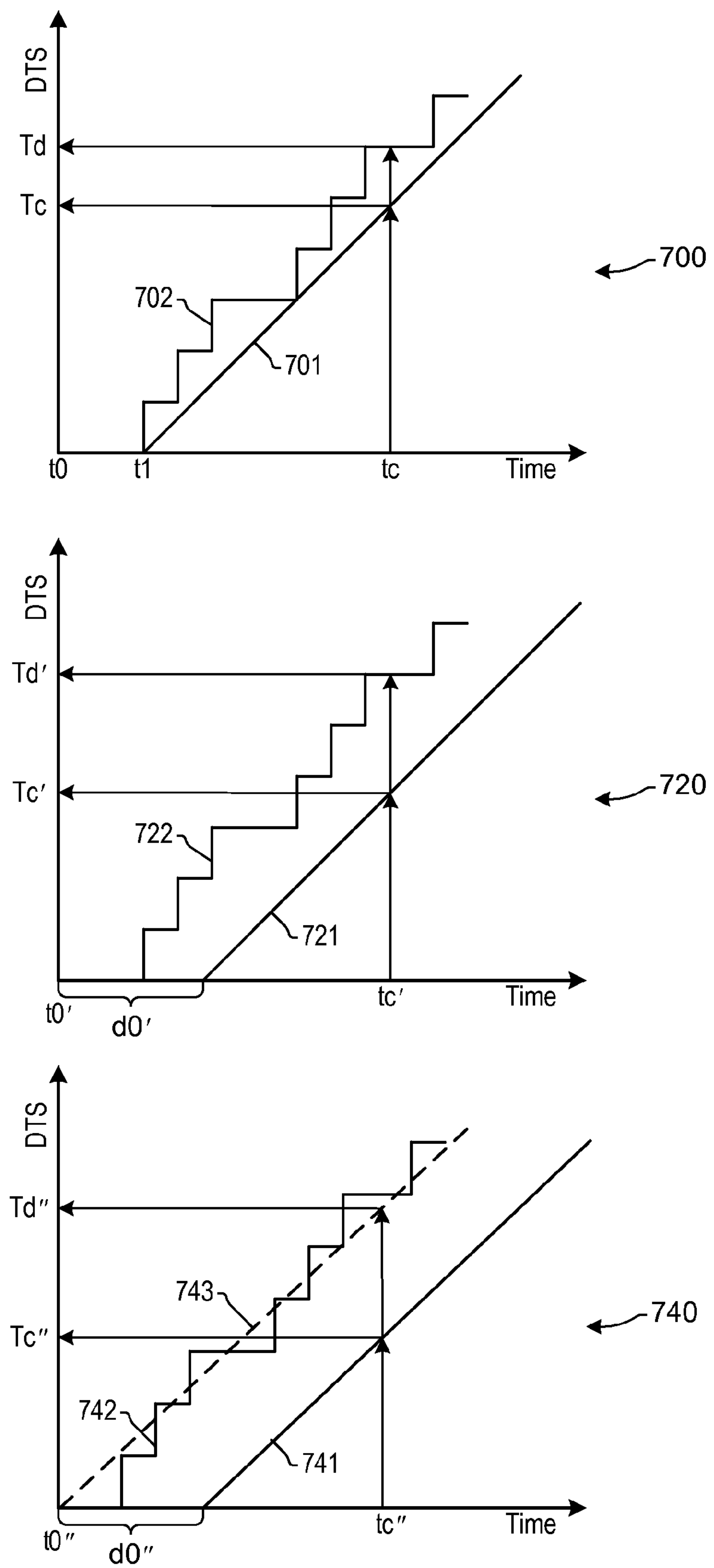
FIG. 7 shows example graphs of video data delivery to a client and video playback illustrating aspects of the invention.

The buffer occupancy estimation module 628 includes operations similar to a video buffer model. Further understanding of the buffer occupancy estimation module 628 may be gained by reference to FIG. 7. FIG. 7 shows example graphs of video data delivery to a client and video playback illustrating aspects of the invention. The graphs plot DTSs versus time. Each example in FIG. 7 illustrates a method the buffer occupancy estimation module 628 may use to estimate client-side video buffer occupancy. Time in each example graph begins at a value t0.

The first example graph 700 plots a video playback 701 and a video delivery 702. Although the term video playback may be used, the buffer estimation may be based on when the client removes video data from a buffer for decoding. The DTS of the video delivery 702 must be larger than or equal to the DTS of the video playback 701. Otherwise the decoder will have no data to decode and the video will freeze. At time t1, in the first example, the first video sample has been completely transferred to the client.

The first example graph 700 shows how the buffer occupancy estimation module 628 may estimate buffer occupancy at the current time tc. As illustrated, at time tc, video samples with DTSs up to Td have been delivered to the client and decoding has advanced to DTS Tc, where Td and Tc are expressed as time, for example, seconds of video delivered and seconds of video decoded, respectively. The value of Td can be determined by the timing information module 627 using one or more of the methods described above.

To determine the video decoding point Tc, the buffer occupancy estimation module 628 can calculate how long the video decoding on the client has been underway. In the method illustrated in the first example graph 700, the buffer occupancy estimation module 628 assumes the client begins decoding the video when the first video sample has been completely delivered, time t1. Accordingly, the video decoding point Tc is the difference between the current time tc and time t1. Thus, the buffer occupancy estimation module 628 can calculate the estimated buffer occupancy as $$BO\_t=Td-(tc-t1).$$

This buffer occupancy may be expressed in units of time (e.g., seconds). If no more data were delivered to the client, video decoding could continue for BO_t. If the buffer occupancy BO_t is zero or negative, the buffer has underflowed and video decoding processing is disrupted and this will eventually lead to a playback freeze event. When an estimated buffer occupancy is negative, it indicates that data that should have arrived at the buffer has not yet arrived. A physical buffer will not have a negative occupancy. The buffer occupancy can be converted from time to bytes. A table that maps data byte counts to DTS may be used. Alternatively, the conversion to bytes may also be estimated using the average bitrate of the video. For various uses, buffer occupancy in terms of time or bytes may be preferred.

The second example graph 720 shows another method the buffer occupancy estimation module 628 may use to estimate buffer occupancy. The second example graph 720 also plots the video playback 721 and the video delivery 722. Estimation of buffer occupancy at the current time tc' is illustrated. At time tc', video samples of DTSs up to Td' have been delivered to the client and video decoding has advanced to DTS Tc'. The value of Td can be determined as described for the first method.

To determine the video decoding point Tc', the buffer occupancy estimation module 628 determines how long the video decoding process has been underway. In the method illustrated in the second example graph 720, the buffer occupancy estimation module 628 uses an initial buffer delay d0' to determine when the video decoding process is started. The timing information module 627 can determine the initial buffer delay d0' from the video stream parameters or from the client type, if the client type can be detected and its behavior is known to the timing information module 627. Since delivery of the video data started at time t0, the video decoding process started at time t0+d0. Accordingly, the time Tc' is the difference between the current time tc' and the decoding start time t0'+d0'. Thus, the buffer occupancy estimation module 628 can calculate the estimated buffer occupancy as BO_t'=Td'−(tc'−(t0'+d0')).

The third example graph 740 shows another method the buffer occupancy estimation module 628 may use to estimate buffer occupancy. The third example graph 740 also plots the video playback 741 and the video delivery 742. In addition, the third example graph 740 plots a constant-rate delivery 743 that assumes video data is delivered at a constant rate. The constant rate may be an average rate. Estimation of buffer occupancy at the current time tc" is illustrated. The buffer occupancy method illustrated in the third example graph 740 is similar to the method illustrated in the second example graph 720 and determines the video decoding point Tc in the same way.

The method illustrated in the third example graph 740 estimates that video samples of DTSs up to Td" from the amount of data delivered. The DTS Td" can be calculated as Td"=D/R, where D is the amount of data delivered and R is the assumed constant video data rate. Thus, the buffer occupancy estimation module 628 can calculate the estimated buffer occupancy as BO_t"=Td"−(tc"−(t0"+d0")). The amount of data delivered to the client may be determined by the timing information module 627 as described above.

The above methods for estimating buffer occupancies produce estimates that may include errors in the information used. For example, an error in the initial buffer delay used can result in a corresponding error in the buffer occupancy estimate. Accordingly, the QoE enhancement module 610 may incorporate information from sources other than the video data (e.g., information about the client, information about the hardware used by the client, information about the user, and historical information) to determine the initial buffer delay. The buffer occupancy estimation module 628 may also adjust the video decoding point Tc to take into account playback freezes previously predicted by the estimated buffer occupancy.

The QoE enhancement module 610 includes a congestion evaluation module 626. The congestion evaluation module 626 analyzes estimated buffer occupancies from the buffer occupancy estimation module 628 to detect traffic congestion. Information about congestion can be used, for example, by other modules to adjust operation of the network node. Congestion is generally indicated when an estimated buffer occupancy is below a threshold level. The threshold level can be chosen to allow for processing and transport time necessary to adjust operation, for example the threshold value can take into consideration TCP packet transport, radio access network transport, or buffer occupancy estimation calculation time.

The congestion evaluation module 626 may use other information as well to detect congestion. For example, congestion evaluation may also use other information, such as the status of resources at the network node in which the QoE enhancement module 610 operates. When the estimated buffer occupancy in a client device is zero but the associated network node has no data to transmit to the client device, the congestion evaluation module 626 may determine that the traffic from the network node to the client device is not congested and that congestion exists upstream of the network node. Alternatively, congestion evaluation module 626 may compare the DTS of the most recent video sample to arrive at the network node from the video server, Td(arrive) and compare it to the estimated playback point of the video client, Tc. If Tc>Td(arrive), the congestion evaluation module 626 may conclude that congestion is occurring upstream of the network node. In these cases, the control response module 621 may send a message containing the video client's estimated buffer occupancy and information related to the network node's local buffer occupancy to one or more upstream nodes.

The congestion evaluation module 626 may use the buffer occupancy estimates to calculate performance metrics. Example metrics include a time-average buffer occupancy. On a per-session basis, the congestion evaluation module 626 may average the buffer occupancy estimates over some period of time. The period of time may be an entire video session.

Another example metric is the elapsed time of video freezes. The congestion evaluation module 626 may run a timer when the buffer occupancy estimate is below a threshold (e.g., zero) to generate a metric indicating the duration of video freezes. The metric may converted to a percentage by dividing the duration of video freezes by a total session time.

Another example metric is a histogram of video freeze durations. The congestion evaluation module 626 may run a timer for each time the buffer occupancy estimate falls below a threshold. The duration times can then be combined in a histogram. The histogram metric may be used, for example, as an input to a video mean opinion score (VMOS) estimate, for example, as described in ITU-T J.247 Annex C.

Other metrics may also be calculated. The metrics can be aggregated, for example, to form a per-bearer, per-user, per-cell, or per-network quality metric. The aggregated metrics can be both on an instantaneous basis and over various time intervals.

The performance metrics derived from the buffer occupancy estimates may be used in various ways. The QoE enhancement module 610 may, for example, transmit the metric to a server that manages the network operations. The server could, for example, be in a core network or could be a cloud-based server. The server could aggregate metrics from multiple access nodes. The metrics may be compared to a threshold level. When the comparison indicates problematic network performance, an alarm may be sent to the network operator. The alarm may be generated, for example, local to a network node that includes the QoE enhancement module 610 or at a server that aggregates metrics from multiple network nodes. Alternatively or in addition, the metrics may be sent to the originating video server in support of dynamic adaptation methods such as rate throttling and traffic shaping which may be used to alleviate temporary network congestion.

The metrics may be further analyzed to assess chronic performance problems. The analysis can be used to determine potential areas for network capacity enhancements. The analysis can also be used to evaluate compliance to or violations of service level agreements. The service level agreements may be, for example, with end users or over-the-top (OTT) service providers (e.g., a carrier may commit to meeting a certain quality level for particular types of video sessions).

The QoE enhancement module 610 includes a control response module 621. The control response module 621 receives information about congestion from the congestion evaluation module 626 and can include the congestion information in control responses for the network node the QoE enhancement module 610 serves. The control response module 621 may also receive the estimated buffer occupancy information. The control responses can adjust scheduling parameters to enhance users' QoE. For example, when a video client's estimated buffer occupancy is below a low threshold, scheduling priority for packets to be transmitted to the client, or scheduling resources allocated to the video stream through the use of scheduling weights or credits, can be increased. When the video client's estimated buffer occupancy is above a high threshold, scheduling priority for packets to be transmitted to the client or scheduling resources can be decreased. The QoE enhancement module 610 may establish a piece-wise linear relationship between scheduling priority (or an application factor used in determining scheduling priority or scheduling resource allocation) and estimated buffer occupancy. Other mathematical relationships between estimated buffer occupancy and scheduling priority or resource allocation may be used.

The QoE enhancement module 610 may include or be used with methods of adjusting scheduling parameters or application factors as described in U.S. patent application Ser. No. 13/607,559, filed Sep. 7, 2012 and titled "Systems and Methods for Congestion Detection for use in Prioritizing and Scheduling Packets in a Communication Network."

The QoE enhancement module 610 may send an indication of congestion to a video client. In response to the congestion indication, the video client may reduce the rate of data it requests thereby reducing congestion. For example, based upon estimated buffer occupancy, the QoE enhancement module 610 may create a control response resulting in the setting of the two Explicit Congestion Notification (ECN) bits in IP packets to a value indicating congestion. The control response indicating congestion can trigger the video client to effect a video codec rate reduction. The use of ECN bits in IP packets is described in IETF RFC 3168 (September 2001): "The Addition of Explicit Congestion Notification (ECN) to IP."

FIG. 6 illustrates a particular allocation of functions to various modules and a particular distribution of modules in various communication nodes. Many other arrangements may also be used. For example, some modules or parts of modules can be distributed to different nodes. For example, modules in FIG. 6 except the control response module 621 may be located in a core based gateway, such as an LTE serving gateway (S-GW), and the control response module 621 may be located in an eNB served by the S-GW. In addition, the gateway from the example above may serve one or more eNBs. That is, the modules in FIG. 6 except the control response module 621 may perform functions in support of video streams transported to one or more eNB. Alternatively, all modules including the control response module 621 may be located in a core based gateway with control responses transmitted to one or more access nodes. The illustrated module may provide additional functions. Although modules of the QoE enhancement module 610 are described for one video session, they may analyze multiple sessions or multiple types of data concurrently.

FIG. 8 is a diagram of a data structure of a video file in accordance with aspects of the invention. The data structure of FIG. 8 is for a file based on ISO BMFF. The basic syntactic structure used for ISO BMFF is a box. Each rectangle in FIG. 8 is a box. A box can contain one or multiple other boxes. In FIG. 8, all boxes immediately to the right of a box are that box's child boxes. Each box includes a length field, a four-character-code as an ID, and the content of the box, if any.

An ISO BMFF based file starts with a file type (ftyp) box 801. The ftyp box 801 is unique to each file format derived from ISO BMFF. The ftyp box 801 includes information such as a file type, file version, and file compatibility. An optional progressive download information (pdin) box 802 may follow. The pdin box 802 includes an initial delay to be used before beginning video decoding and subsequent playback of decoded video. The initial delay from the pdin box 802 may be used, for example, by a QoE enhancement module in emulating operation of a video client's behavior.

A metadata container (moov) box 810 contains the metadata of the movie file. Note that ISO BMFF uses the term movie for videos. The moov box 810 includes information about the structure of the movie file and may be considered a header for the movie file. For a long video, the moov box 810 can include several megabytes of metadata.

A media data (mdat) box 890 contains media sample data for the movie. The moov box 810 can be used to locate particular data in the mdat box 890. The moov box 810 is before the mdat box 890 in a file conforming to progressive download requirements. For file storage purposes, the moov box 810 can be after the mdat box 890. Other similar file organization may be used, for example, a video may have interleaved fragments of metadata and media data.

Example code for use in parsing an ISO BMFF video and generating a table for mapping data locations to decoding time stamps will also be described. The methods described may be performed, for example, by the buffer occupancy estimation module 628 of FIG. 6. The example uses the ISO base media file format illustrated in FIG. 8. Many other file formats (e.g., MP4, 3GP, PIFF, and F4V) are similar to ISO BMFF. The methods described for ISO BMFF may be applied to other file formats.

The moov box 810 contains a movie header (mvhd) box 815, a track (trak) box 820, further track boxes 825 if any, and a movie extends (mvex) box 880. The mvhd box 815 contains overall information about the movie. The trck box 820 or any one of the further track boxes 825 contains metadata for one track of the movie. The mvex box 880 is used when the media data is fragmented. The mvex box 880 contains a movie extends header (mehd) box 881 and a track extends defaults (trex) box 882.

The trck box 820 contains a track header (tkhd) box 821, an edit (edts) box 822 that contains an edit list (elst) box 823, and a media information (mdia) box 830. The mdia box 830 provides characteristic information of the media in the track and contains a media header (mdhd) box 831, a handler reference (hdlr) box 832, and a media information (minf) box 840. The mdhd box 831 provides media-independent information relevant to characteristics of media in the track. The hdlr box 832 can provide information about how to handle media in the track.

The minf box 840 provides characteristic information of the media in the track. The minf box 840 contains a video media header (vmhd) box 842 and a data information (dinf) box 844 that contains a data reference (dref) box 846 that provides a table of data references.

The minf box 840 also contains a sample table (stbl) box 860. Information in the stbl box 860 is used to identify sample data in mdat box 890. The stbl box 860 contains a sample description (stsd) box 861, decoding time to sample (stts) box 862, a sync sample (ssts) box 863, a sample size (stsz) box 864, a sample-to-chunk (stsc) box 865, a chunk offset (stco) box 866, and an independent and disposable samples (sdtp) box 867.

The time a video sample is removed from a video stream buffer and decoded is specified in the stts box 862. The syntactic structure of the stts box 862 is listed in Table 1. The DTS of each sample is specified differentially as sample_delta. In addition, consecutive samples having the same sample_delta are grouped. In the following discussion, variable "td" is used in referring to the DTS of a video sample.

TABLE 1

ISO BMFF Time-to-Sample Box "stts" Structure

```
aligned(8) class TimeToSampleBox
extends FullBox('stts', version = 0, 0) {
    unsigned int(32) entry__count;
    int i;
```

TABLE 1-continued

ISO BMFF Time-to-Sample Box "stts" Structure

```
    for (i=0; i < entry_count; i++) {
        unsigned int(32) sample_count;
        unsigned int(32) sample_delta;
    }
}
```

entry_count - is an integer that gives the number of entries in the following table.
sample_count - is an integer that counts the number of consecutive samples that have the given duration.
sample_delta - is an integer that gives the delta of these samples in the time-scale of the media.

In addition to the DTS, locating a video sample uses an offset of each video sample in the video stream and the size of each video sample. This information can be obtained by parsing the stsz box 864, the stsc box 865, and the stco box 866. Parsing this data can start with grouping samples into chunks. A chunk is a group of samples of the same sample type that are stored consecutively in the mdat box 890.

The stsc box 865 has information on how many samples are in each chunk and an index to the sample description for samples in the chunk. The structure of the stsc box 865 is listed in Table 2. Consecutive chunks of the same sample type having the same "samples_per_chunk" and "sample_description_index" are grouped in the stsc box 865. This is controlled using the field "first_chunk."

TABLE 2

ISO BMFF Sample-to-Chunk Box "stsc" Structure

```
aligned(8) class SampleToChunkBox
extends FullBox('stsc', version = 0, 0) {
    unsigned int(32) entry_count;
    for (i=1; i <= entry_count; i++) {
        unsigned int(32) first_chunk;
        unsigned int(32) samples_per_chunk;
        unsigned int(32) sample_description_index;
    }
}
```

entry_count is an integer that gives the number of entries in the following table.
first_chunk is an integer that gives the index of the first chunk in this run of chunks that share the same samples-per-chunk and sample-description-index; the index of the first chunk in a track has the value 1 (the first_chunk field in the first record of this box has the value 1, identifying that the first sample maps to the first chunk).
samples_per_chunk is an integer that gives the number of samples in each of these chunks.
sample_description_index is an integer that gives the index of the sample entry that describes the samples in this chunk. The index ranges from 1 to the number of sample entries in the Sample Description Box.

The stco box 866 has information on the offset of each chunk in the video file starting from the beginning of the file. Its structure is listed in Table 3. After parsing the stsc box 865 and the stco box 866, the mapping from the sample to the chunk and offset of the first sample in a chunk in the file can be established.

TABLE 3

ISO BMFF Chunk Offset Box "stco" Structure

```
aligned(8) class ChunkOffsetBox
extends FullBox('stco', version = 0, 0) {
    unsigned int(32) entry_count;
    for (i=1; i <= entry_count; i++) {
        unsigned int(32) chunk_offset;
    }
}
```

entry_count is an integer that gives the number of entries in the following table.
chunk_offset is a 32 or 64 bit integer that gives the offset of the start of a chunk into its containing media file.

The stsz box 864 specifies the size of each sample for a movie track. The structure of the stsz box 864 is listed in Table 4.

TABLE 4

ISO BMFF Sample Size Box "stsz" Structure

```
aligned(8) class SampleSizeBox extends FullBox('stsz',
version = 0, 0) {
    unsigned int(32) sample_size;
    unsigned int(32) sample_count;
    if (sample_size==0) {
        for (i=1; i <= sample_count; i++) {
            unsigned int(32) entry_size;
        }
    }
}
```

sample_size is integer specifying the default sample size. If all the samples are the same size, this field contains that size value. If this field is set to 0, then the samples have different sizes, and those sizes are stored in the sample size table. If this field is not 0, it specifies the constant sample size, and no array follows.
sample_count is an integer that gives the number of samples in the track; if sample-size is 0, then it is also the number of entries in the following table.
entry_size is an integer specifying the size of a sample, indexed by its number.

After parsing the stsz box 864, the stsc box 865, and the stco box 866, the offset of each sample in a file and the size of each sample can be obtained. This information can be combined with the DTS parsed from the stts box 862 to generate a table, for example, the example in Table 5, for mapping byte counts to samples and their DTSs. The total amount of data transmitted can be estimated using the methods described above. In this example, the table has one record for each video sample in the video file.

In Table 5, the sample offset is the offset of the first byte of a video sample with respect to the beginning of the video file. A buffer occupancy estimation module can compares the amount of video data delivered, D, to the sample offsets to know the DTS for which samples have been delivered. For example, using example of Table 5, if the total amount of video data transmitted is 166000 bytes, it is known that the second video frame has been completely transferred and the DTS of the last complete video sample has been advanced to 33 ms.

TABLE 5

ISO BMFF Offset to Sample Timing Mapping

| Sample Index | Sample Offset (bytes) | Sample Size (bytes) | Sample Decoding Time Stamp (ms) |
|---|---|---|---|
| 0 | 103578 | 52234 | 0 |
| 1 | 155812 | 10023 | 33 |
| 2 | 165835 | 8000 | 66 |
| . . . | | | |

The information in the table can be generated by parsing the moov box 810. The moov box 810 will usually span multiple TCP segments. Accordingly, parsing the moov box 810 may take care that the typical TCP issues (e.g., packet reordering, lost packets, and duplicated packets) do not affect the parsing. While a buffer occupancy estimation module may parse the moov box 810, it may only estimate the number of bytes transmitted for the mdat box 890. The DTS of the last completely transmitted video sample can be calculated by comparing the amount of bytes in mdat box 890 that has been transmitted and the array of sample information, including offset, sample size, and sample DTS. The client-side buffer occupancy in units of time can be estimated as the difference between the DTS of the last completely transmitted video sample and the total video transfer time. Considering the client often does not start consuming video data immediately, the client-side buffer occupancy in units of time can be adjusted by adding the initial buffer delay of the client.

The foregoing systems and methods and associated devices and modules are susceptible to many variations. Additionally, for clear and brief description, many descriptions of the systems and methods have been simplified. For example, the figures generally illustrate one of each type of device (e.g., one access node, one terminal node), but a communication system may have many of each type of device. Similarly, many descriptions use terminology and structures of a specific wireless standard such as LTE. However, the disclosed systems and methods are more broadly applicable, including for example, in hybrid fiber-coax cable modem systems.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An access node, comprising:
- a transceiver module configured to communicate with a terminal node;
- a backhaul interface module configured to provide communications with a video server;
- a processor coupled to the transceiver module and the backhaul interface module, the processor arranged for
  - parsing a metadata portion of a video stream to be delivered to the terminal node to determine characteristics of the video stream, the characteristics of the video stream including a mapping from byte locations in the video stream to corresponding decoding time stamps,
  - estimating occupancy of a video buffer in the terminal node using the mapping from byte locations in the video stream to corresponding decoding time stamps, and
  - receiving downlink packets via the backhaul interface module and scheduling the downlink packets for transmission by the transceiver module utilizing scheduler parameters, the scheduler parameters based at least in part on the estimated occupancy of the video buffer in the terminal node.

2. The access node of claim 1, wherein the processor is further arranged for:
- analyzing packets to be delivered to the terminal node to detect characteristics of the packets and classifying the packets using the detected characteristics;
- analyzing packets associated with the video stream to determine timing information related to the video stream;
- using the timing information in estimating occupancy of the video buffer in the terminal node;
- detecting traffic congestion by analyzing the estimated video buffer occupancy; and
- determining the scheduler parameters based at least in part on information about the detected traffic congestion.

3. The access node of claim 2, wherein the processor is further arranged for analyzing packets from the terminal node to detect information about which parts of the video stream have been delivered to the terminal node.

4. The access node of claim 1, wherein the estimated video buffer occupancy is in units of time.

5. The access node of claim 1, wherein the characteristics of the video stream further include an initial buffer delay, and wherein the processor is further arranged for using the initial buffer delay in estimating occupancy of the video buffer in the terminal node.

6. The access node of claim 1, wherein the processor is further arranged for emulating behavior of a video client in the terminal node for use in estimating the occupancy of the video buffer.

7. The access node of claim 6, wherein the processor is further arranged for determining a current decoding time of the video stream for use in emulating behavior of the video client in the terminal node.

8. An access node, comprising:

a transceiver module configured to communicate with a terminal node;

a backhaul interface module configured to provide communications with a content server; and a processor coupled to the transceiver module and the backhaul interface module, the processor arranged for receiving packets from the backhaul interface module, some of the packets containing a video stream for delivery to the terminal node, inspecting the received packets to determine information about the video stream, the inspecting including parsing metadata associated with the video stream to determine characteristics of the video stream, the characteristics of the video stream including a mapping from byte locations in the video stream to corresponding decoding time stamps, and estimating occupancy of a video buffer in the terminal node using the mapping from byte locations in the video stream to corresponding decoding time stamps.

9. The access node of claim 8, wherein the processor is further arranged for scheduling the received packets for transmission by the transceiver module utilizing scheduler parameters, the scheduler parameters based at least in part on the estimated occupancy of the video buffer in the terminal node.

10. The access node of claim 8, wherein the estimated occupancy of the video buffer is in units of time.

11. The access node of claim 8, wherein estimating occupancy of the video buffer comprises using the mapping from byte locations in the video stream to corresponding decoding time stamps to estimate which video samples have been delivered to the terminal node and the corresponding decoding time stamps.

12. The access node of claim 8, wherein estimating occupancy of the video buffer comprises emulating behavior of a video client in the terminal node.

13. The access node of claim 12, wherein emulating behavior of the video client in the terminal node comprises determining a current decoding time of the video stream.

14. A method for use in operating an access node that transmits and receives packets to and from a terminal node to provide communications with the terminal node, the packets including packets conveying a video stream, the method comprising:

receiving packets associated with the video stream;

inspecting the packets to determine characteristics of the video stream, the inspecting including parsing a metadata portion of the video stream, the characteristics of the video stream including a mapping from byte locations in the video stream to corresponding decoding time stamps;

estimating which packets conveying the video stream have been delivered to the terminal node; and estimating occupancy of a video buffer in the terminal node using the characteristics of the video stream and information about which of the packets conveying the video stream have been delivered to the terminal node.

15. The method of claim 14, wherein the receiving, the inspecting, and the estimating which packets conveying the video stream have been delivered to the terminal node, and the estimating occupancy of the video buffer in the terminal node are performed by at least two different nodes.

16. The method of claim 14, further comprising scheduling the received packets for transmission from the access node utilizing scheduler parameters, the scheduler parameters based at least in part on the estimated occupancy of the video buffer in the terminal node.

17. The method of claim 14, further comprising detecting congestion based at least in part on the estimated occupancy of the video buffer in the terminal node.

18. The method of claim 17, further comprising scheduling the received packets for transmission from the access node utilizing scheduler parameters, the scheduler parameters based at least in part on the detected congestion.

19. The method of claim 14, further comprising generating performance metrics using the estimated occupancy of the video buffer.

20. The method of claim 19, wherein the performance metrics include information about predicted video freezes at the terminal node.

21. The method of claim 19, further comprising scheduling the received packets for transmission from the access node utilizing scheduler parameters, the scheduler parameters based at least in part on the performance metrics.

22. The method of claim 19, wherein the performance metrics include information about congestion upstream of the access node.

23. The method of claim 14, wherein the occupancy of the video buffer is estimated in units of time.

24. The method of claim 14, wherein estimating which of the packets conveying the video stream have been delivered to the terminal node comprises detecting sequence numbers of transmission control protocol (TCP) segments transmitted to the terminal node.

25. The method of claim 14, wherein estimating which of the packets conveying the video stream have been delivered to the terminal node comprises detecting acknowledgment numbers of transmission control protocol (TCP) acknowledgment messages received from the terminal node.

26. The method of claim 14, wherein parsing the metadata portion of the video stream comprises storing the metadata and parsing the stored metadata.

27. The method of claim 14, wherein the characteristics of the video stream include a bitrate.

28. The method of claim 14, wherein the characteristics of the video stream include an initial buffer delay.

29. The method of claim 14, wherein the mapping from byte locations in the video stream to corresponding decoding time stamps is used to estimate which video samples have been delivered to the terminal node and the corresponding decoding time stamps.

30. The method of claim 14, wherein estimating occupancy of the video buffer comprises emulating behavior of a video client in the terminal node.

31. The method of claim 30, wherein emulating behavior of the video client in the terminal node comprises estimating a current decoding time stamp corresponding to processing of the video stream by the video client.

32. The method of claim 31, wherein emulating behavior of the video client in the terminal node further comprises subtracting the current decoding time stamp corresponding to processing of the video stream by the video client from a latest decoding time stamp corresponding to the packets conveying the video stream that have been delivered to the terminal node.

33. The method of claim 31, wherein estimating the current decoding time stamp corresponding to processing of the video stream by the video client comprises:

determining the starting time that delivery of the video stream to the terminal node began;

determining the current time; and subtracting an initial buffer delay and the starting time from the current time.

34. The method of claim 31, wherein emulating behavior of the video client in the terminal node comprises determining an initial buffer delay, and wherein determining the current decoding time stamp corresponding to processing of the video stream by the video client takes into account the initial buffer delay.

35. The method of claim 34, wherein determining the initial buffer delay is based at least in part on the characteristics of the video client.

36. The method of claim 34, wherein determining the initial buffer delay is based at least in part on characteristics of the terminal node.

37. The method of claim 31, wherein determining the current decoding time stamp corresponding to processing of the video stream by the video client comprises dividing a quantity of bytes associated with the video stream transmitted to the terminal node by a bitrate.

* * * * *